US012197143B2

(12) United States Patent
Suzuki et al.

(10) Patent No.: US 12,197,143 B2
(45) Date of Patent: Jan. 14, 2025

(54) IMAGE FORMING APPARATUS AND INFORMATION PROCESSING DEVICE

(71) Applicant: CANON KABUSHIKI KAISHA, Tokyo (JP)

(72) Inventors: Ryo Suzuki, Chiba (JP); Nobuaki Suzuki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/378,895

(22) Filed: Oct. 11, 2023

(65) Prior Publication Data

US 2024/0126187 A1 Apr. 18, 2024

(30) Foreign Application Priority Data

Oct. 12, 2022 (JP) ................................ 2022-163776

(51) Int. Cl.

*G03G 15/08* (2006.01)
*G03G 15/00* (2006.01)
*G03G 15/01* (2006.01)
*G03G 15/10* (2006.01)

(52) U.S. Cl.

CPC ....... *G03G 15/0115* (2013.01); *G03G 15/105* (2013.01); *G03G 15/556* (2013.01)

(58) Field of Classification Search

CPC .. G03G 15/0115; G03G 15/08; G03G 15/105; G03G 15/556

USPC ........................................................... 399/27

See application file for complete search history.

(56) References Cited

U.S. PATENT DOCUMENTS

| | | | | |
|---|---|---|---|---|
| 9,261,843 | B2 * | 2/2016 | Ito | G03G 15/556 |
| 2006/0233559 | A1 | 10/2006 | Sugita et al. | |
| 2009/0097869 | A1 | 4/2009 | Kono et al. | |
| 2009/0109453 | A1 * | 4/2009 | Nakahara | H04N 1/40006 358/1.9 |
| 2010/0098443 | A1 * | 4/2010 | Oka | G03G 15/0131 358/1.9 |

* cited by examiner

*Primary Examiner* — Hoan H Tran
(74) *Attorney, Agent, or Firm* — Venable LLP

(57) ABSTRACT

An image forming apparatus includes an image forming unit configured to form an image with toner, a halftone processor configured to convert image data by performing halftone processing, a first determining unit configured to determine a first toner consumption amount for each page based on the image data, a second determining unit configured to determine a second toner consumption amount for each page based on the converted image data, a print percentage calculator configured to calculate a print percentage for one page based on the first toner consumption amount, a notifying unit configured to notify a remaining amount of the toner of the image forming unit based on the first toner consumption amount of a page of which the print percentage is larger than a threshold and the second toner consumption amount of a page of which the print percentage is equal to or smaller than the threshold.

8 Claims, 10 Drawing Sheets

| INPUT PIXEL VALUE | CORRECTED PIXEL VALUE |
|---|---|
| 0 | 0 |
| 1 | 1 |
| 2 | 2 |
| 3 | 2 |
| ... | |
| ... | |
| 12 | 10 |
| 13 | 10 |
| 14 | 11 |
| 15 | 11 |
| 16 | 12 |
| 17 | 12 |
| ... | |
| ... | |
| 31 | 23 |
| ... | |
| 63 | 47 |
| ... | |
| 127 | 127 |

| INPUT PIXEL VALUE | CORRECTED PIXEL VALUE |
|---|---|
| ... | |
| ... | |
| ... | |
| ... | |
| ... | |
| ... | |
| ... | |
| ... | |
| ... | |
| 192 | 200 |
| ... | |
| 228 | 244 |
| ... | |
| 250 | 255 |
| 251 | 255 |
| 252 | 255 |
| 253 | 255 |
| 254 | 255 |
| 255 | 255 |

FIG. 9

| LINE WIDTH | COUNT VALUE | CORRECTION COEFFICIENT | CORRECTED COUNT VALUE |
|---|---|---|---|
| Count1 | 500 | 0.5 | 250 |
| Count2 | 1000 | 3.0 | 3000 |
| Count3 | 1500 | 2.3 | 3450 |
| Count4 | 3000 | 2.0 | 6000 |
| Count5 | 2000 | 1.8 | 3600 |
| Count6 | 1200 | 1.6 | 1920 |
| Count7 | 840 | 1.4 | 1176 |
| Count8 | 480 | 1.2 | 576 |
| Count*-* | 300 | 1.0 | 300 |

IMAGE FORMING APPARATUS AND INFORMATION PROCESSING DEVICE

BACKGROUND OF THE INVENTION

Field of the Invention

The present disclosure relates to an image forming apparatus such as a printer, a copying machine, a facsimile machine, or a multifunction peripheral.

Description of the Related Art

Some electrophotographic image forming apparatus calculate a consumption amount of a developer each time an image is formed, and display a remaining amount of the developer on a display. As a method of detecting the remaining amount of the developer, there is a method using a sensor. In a case of using a sensor, there are mechanical constraints caused by reduction in size and space saving of an image forming apparatus. In addition, an increase in cost due to addition of a component and a design change is expected. Therefore, there has been proposed a method of estimating the consumption amount of the developer from image data representing an image to be formed. US 2006/0233559 and US 2009/0097869 are examples of such an estimation method.

In US 2006/0233559, there is disclosed a toner consumption amount calculation method involving calculating a density value of each pixel from image data that has not been subjected to halftone processing and calculating a toner consumption amount for each pixel from the calculated density value. In this toner consumption amount calculation method, toner consumption amounts for respective pixels are integrated for each page to calculate a toner consumption amount for each page. The halftone processing is processing for correcting an input signal value of a tone portion so that a relationship between the input signal value and an image density is in an ideal fixed state. With such a toner consumption amount calculation method, it is possible to accurately calculate a toner consumption amount for the tone portion by calculating the toner consumption amount through use of the image data that has not been subjected to the halftone processing.

In US 2009/0097869, there is disclosed a toner consumption amount calculation method that takes into account a phenomenon (edge effect) that more toner is consumed for printing dots arranged at an edge portion of an image than for printing dots in a so-called solid portion. In this toner consumption amount calculation method, a weighting coefficient is provided in advance for each pixel in accordance with continuity of printing pixels. Toner consumption amounts per pixel are each calculated by multiplying a toner consumption amount of each pixel by a weighting coefficient corresponding thereto, and a toner consumption amount for an image corresponding to one page is calculated by integrating the toner consumption amounts for all pixels included in the image. With such a toner consumption amount calculation method, it is possible to accurately calculate a toner consumption amount for a character portion that is strongly affected by the edge effect.

With the toner consumption amount calculation method of US 2006/0233559, it is possible to calculate the toner consumption amount for the tone portion with high accuracy, but calculation accuracy of the toner consumption amount for a portion (for example, character portion) that is strongly affected by the edge effect is not high. Meanwhile, with the toner consumption amount calculation method of US 2009/0097869, it is possible to calculate the toner consumption amount for the character portion with high accuracy, but calculation accuracy of the toner consumption amount for the tone portion is not high. Therefore, an image forming apparatus using any one of the toner consumption amount calculation methods cannot calculate a toner consumption amount with high accuracy depending on the image to be formed. In view of the above-mentioned problem, the present disclosure has a main object to provide an image forming apparatus capable of calculating a toner consumption amount with high accuracy.

SUMMARY OF THE INVENTION

An image forming apparatus according to one embodiment of the present disclosure includes a halftone processor configured to convert image data by performing halftone processing, an image forming unit configured to form an image with toner based on the image data converted by the halftone processor, a first determining unit configured to determine a first toner consumption amount for each page based on the image data before conversion by the halftone processor, a second determining unit configured to determine a second toner consumption amount for each page based on the image data after conversion by the halftone processor, a print percentage calculator configured to calculate a print percentage for one page based on the first toner consumption amount, and a notifying unit configured to notify a remaining amount of the toner of the image forming unit based on the first toner consumption amount of a page of which the print percentage is larger than a threshold and the second toner consumption amount of a page of which the print percentage is equal to or smaller than the threshold.

Further, an information processing device, according to another embodiment of the present disclosure and which is communicably connected to a printer configured to form an image with toner based on image data, includes a halftone processor configured to convert image data by performing halftone processing and transmit the image data to the printer, wherein the printer forms the image based on the converted image data transmitted from the halftone processor, a first calculator configured to calculate a first toner consumption amount for each page based on the image data before performing the halftone processing by the halftone processor, a second calculator configured to calculate a second toner consumption amount for each page based on the converted image data, a print percentage calculator configured to calculate a print percentage for one page based on the first toner consumption amount, and an outputting unit configured to output a remaining amount of the toner of the image forming unit based on the first toner consumption amount of a page of which the print percentage is larger than a threshold and the second toner consumption amount of a page of which the print percentage is equal to or smaller than the threshold.

Further features of the present invention will become apparent from the following description of exemplary embodiments (with reference to the attached drawings).

BRIEF DESCRIPTION OF THE DRAWINGS

FIG. 9 shows an example of a weighting coefficient table.

DESCRIPTION OF THE EMBODIMENTS

At least one preferred embodiment of the present disclosure is illustratively described in detail below with reference to the drawings. Relative placement of components, numerical values, and the like described in the at least one embodiment are not intended to limit the scope of the present disclosure only thereto unless otherwise specified.

<Image Forming Apparatus>

Figure 1:
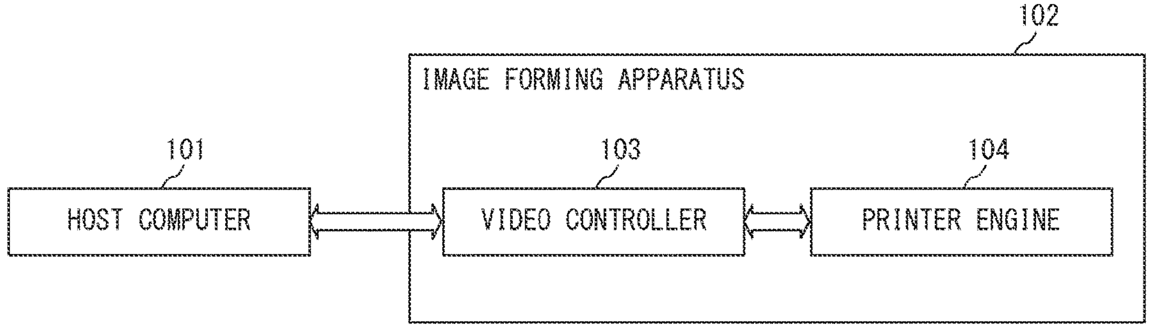
FIG. 1 is a configuration diagram of an image forming apparatus.

FIG. 1 is a configuration diagram of an image forming apparatus according to the at least one embodiment. An image forming apparatus 102 according to the at least one embodiment is a color image forming apparatus that forms an image in four colors of yellow (Y), magenta (M), cyan (C), and black (K), but the present disclosure can also be applied to a monochrome image forming apparatus. Further, it is assumed that the image forming apparatus 102 according to the at least one embodiment performs printing at a resolution of 600 dpi.

The image forming apparatus 102 includes a video controller 103 that performs various kinds of control and data processing and a printer engine 104 that forms a visualized image on a transfer material 11. The transfer material 11 is also called “recording material”, “recording medium”, “sheet”, or “transfer paper”. The image forming apparatus 102 is connected to a host computer 101 or the like through an interface such as a network, parallel interface, or serial interface. The host computer 101 instructs the image forming apparatus 102 to execute printing. The video controller 103 rasterizes print data transmitted from the host computer 101 together with a print execution instruction into image data, performs data processing (described later) thereon, and transmits the image data to the printer engine 104.

<Printer Engine>

Figure 2:
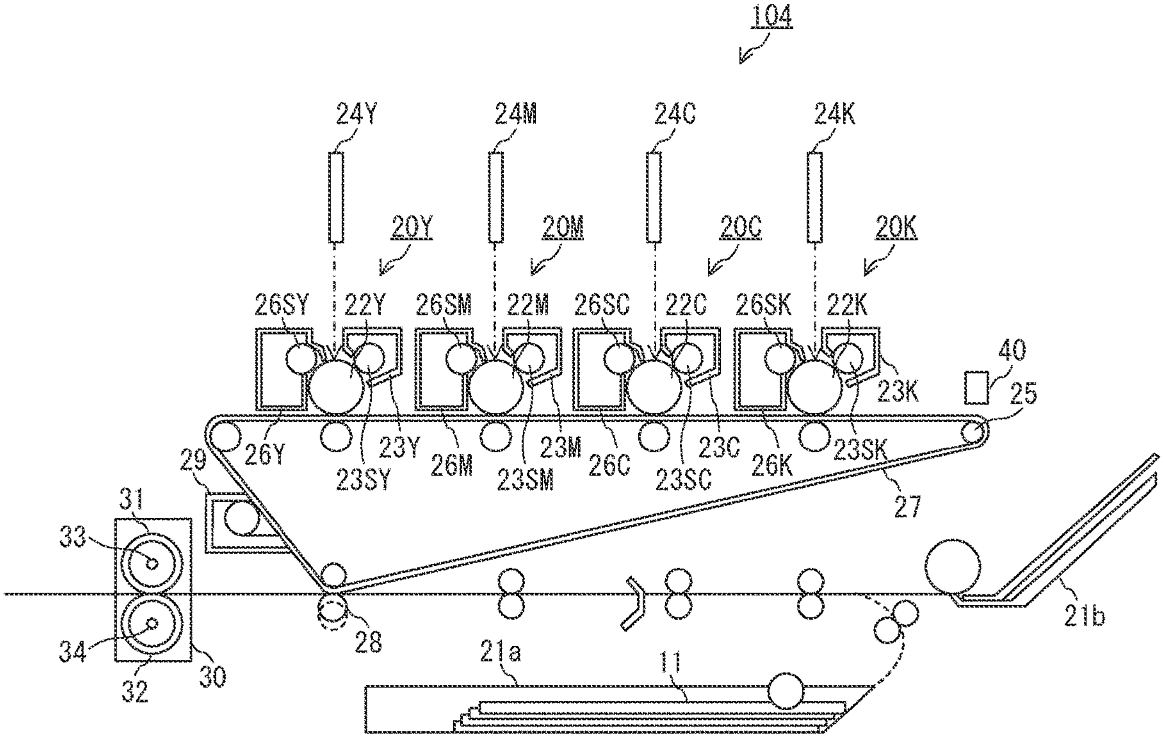
FIG. 2 is a configuration diagram of a printer engine.
Figure 3:
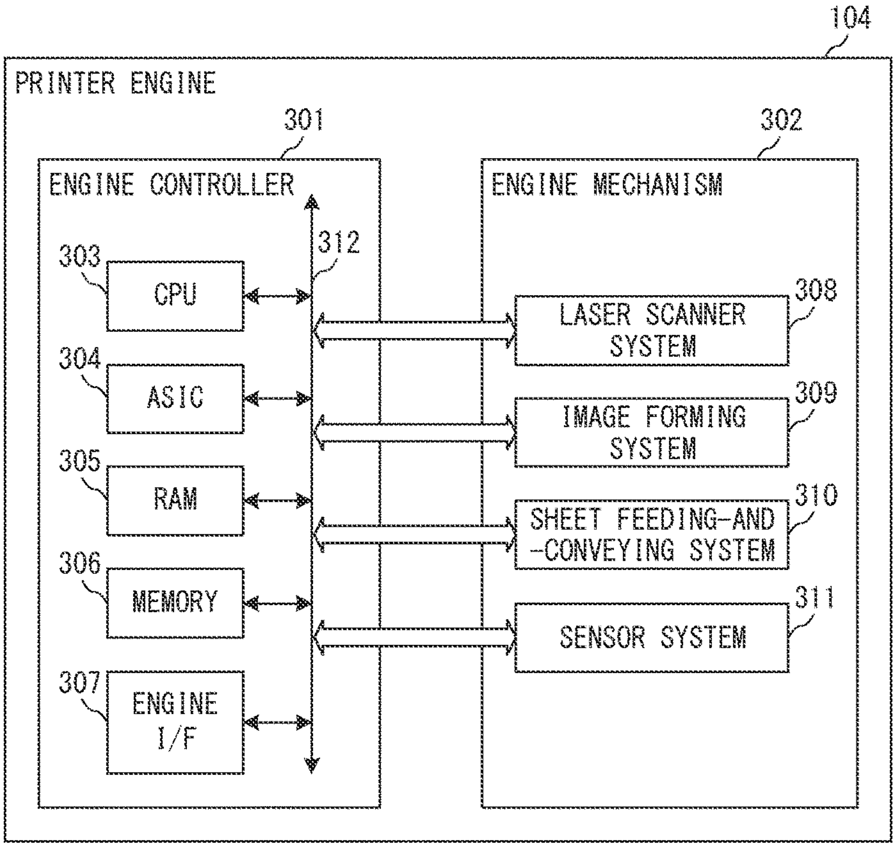
FIG. 3 is an explanatory diagram of a control unit.

FIG. 2 is a configuration diagram of the printer engine 104. FIG. 3 is an explanatory diagram of a control unit that controls an operation of the printer engine 104. The printer engine 104 in the at least one embodiment uses toners of four colors, namely, yellow, magenta, cyan, and black as developers. The printer engine 104 is of a tandem type in which four image forming units 20Y, 20M, 20C, and 20K corresponding to the four colors of yellow, magenta, cyan, and black are provided along an intermediate transfer member 27. The four image forming units 20Y, 20M, 20C, and 20K have the same configuration. Each component of the four image forming units 20Y, 20M, 20C, and 20K has Y, M, C, or K at the end of each reference numeral so that a color corresponding thereto can be identified, but Y, M. C. and K at the end of each reference numeral is omitted unless description specific to each color is required.

The printer engine 104 includes an engine controller 301 and an engine mechanism 302. The engine mechanism 302 performs image formation on the transfer material 11 by operating in accordance with various instructions acquired from the engine controller 301.

The engine mechanism 302 includes a laser scanner system 308, an image forming system 309, a sheet feeding-and-conveying system 310, and a sensor system 311. The laser scanner system 308 and the image forming system 309 are used to form an image on the transfer material 11. The sheet feeding-and-conveying system 310 conveys the transfer material 11 during the image formation. The sensor system 311 includes a plurality of sensors that monitor an operation of each component of the engine mechanism 302. A detection result obtained by the sensor system 311 is transmitted to the engine controller 301.

The image forming system 309 of the engine mechanism 302 includes the four image forming units 20, the intermediate transfer member 27, a transfer roller 28 that transfers a toner image onto the transfer material 11, and a fixing device 30. In addition, the image forming system 309 includes a high-voltage power supply that generates various bias voltages (high voltages) required for image formation. The laser scanner system 308 of the engine mechanism 302 includes an exposure device 24.

The four image forming units 20 each include a photosensitive drum 22, a charging device 23, and a developing device 26. The image forming units 20 are each detachably attachable to a main body of the printer engine 104. The four image forming units 20 each include a nonvolatile memory device.

The photosensitive drum 22 is a drum-shaped photosensitive member having a photosensitive layer on a surface thereof, and is configured to rotate about a drum shaft. The charging device 23 uniformly charges the surface of the rotating photosensitive drum 22. The charging device 23 includes a charging sleeve 23S, and charges the photosensitive drum 22 by applying a bias voltage to the charging sleeve 23S. The photosensitive drum 22 having the uniformly charged surface is exposed to light by the exposure device 24 to form an electrostatic latent image corresponding to the image data. The developing device 26 visualizes an image by causing a toner serving as a developer to adhere to the electrostatic latent image formed on the photosensitive drum 22. The developing device 26 contains the toner as the developer and has a developing sleeve 26S. The developing sleeve 26S causes the toner to adhere to the electrostatic latent image. The toner image is thus formed on the photosensitive drum 22.

The exposure device 24 includes a laser light-emitting element, a laser driver, a scan motor, a rotary polygon mirror, and a scan driver. The exposure device 24 causes the laser light-emitting element to emit laser light based on a laser drive signal, and causes the rotary polygon mirror to reflect the laser light, to thereby expose and scan the photosensitive drum 22. The laser drive signal indicates an exposure time of the laser light, and is output from the video controller 103. Through selective exposure of the surface of the photosensitive drum 22 with the laser light, the electrostatic latent image is formed on the surface of the photosensitive drum 22.

The toner images formed on the photosensitive drums 22Y, 22M, 22C, and 22K of the image forming units 20Y, 20M, 20C, and 20K, respectively, are superimposed on one another and transferred onto the intermediate transfer member 27. The toner images of the respective colors that have been transferred onto the intermediate transfer member 27 are collectively transferred onto the transfer material 11 by the transfer roller 28. The transfer material 11 onto which the toner images have been transferred has the toner images fixed thereto by the fixing device 30.

The intermediate transfer member 27 is an endless belt stretched around a plurality of rollers such as a drive roller 25. The intermediate transfer member 27 is driven to rotate by the drive roller 25, and the toner images are sequentially transferred thereonto from the photosensitive drums 22Y, 22M, 22C, and 22K. The intermediate transfer member 27 is rotated to convey the transferred toner images to the transfer roller 28. The transfer material 11 is conveyed to the transfer roller 28 at the same timing as a timing at which the toner images are conveyed thereto by the intermediate transfer member 27. A cleaner 29 is provided downstream of the transfer roller 28 in a rotation direction of the intermediate transfer member 27.

In a case where the transfer roller 28 rotates in contact with the intermediate transfer member 27, the transfer material 11 is nipped and conveyed between the intermediate transfer member 27 and the transfer roller 28. At this time, a transfer bias voltage is applied to the transfer roller 28 to collectively transfer the toner images of the four colors on the intermediate transfer member 27 onto the transfer material 11. The transfer roller 28 abuts against the transfer material 11 by being biased toward the intermediate transfer member 27 while the toner images are being transferred onto the transfer material 11, and is separated from the intermediate transfer member 27 in a case where the transfer is completed. The transfer material onto which the toner images have been transferred is conveyed to the fixing device 30. The cleaner 29 removes toner remaining on the intermediate transfer member 27 after the transferring.

The fixing device 30 includes a fixing roller 31 that heats the transfer material 11 and a pressure roller 32 that brings the transfer material 11 into pressure contact with the fixing roller 31. The fixing device 30 melts the toner images on the transfer material 11 and fixes the toner images thereto while nipping and conveying the transfer material 11 between the fixing roller 31 and the pressure roller 32. The fixing roller 31 and the pressure roller 32 are each formed in a hollow shape, and are provided with heaters 33 and 34, respectively, therein. The transfer material 11 to which the image has been fixed by the fixing device 30 is delivered outside the image forming apparatus 102 as a printed matter.

The sheet feeding-and-conveying system 310 feeds and conveys the transfer material 11. The sheet feeding-and-conveying system 310 includes various conveyance system motors, a sheet feeder (sheet feeding cassette 21*a* and sheet feeding tray 21*b*), and various conveyance rollers including a sheet feeding roller and a sheet delivery roller. The sheet feeding-and-conveying system 310 feeds the transfer materials 11 one by one from the sheet feeding cassette 21*a* or the sheet feeding tray 21*b* to the transfer roller 28 in accordance with an operation of the image forming system 309.

The sensor system 311 is a sensor group for collecting information required for controlling the laser scanner system 308, the image forming system 309, and the sheet feeding-and-conveying system 310. The sensor group includes a temperature sensor that detects a fixing temperature of the fixing device 30, an image density sensor 40 that detects an image density of a toner image, a sensor that detects color misregistration, a sheet size sensor, a sheet leading edge detection sensor, and a sheet conveyance detection sensor. The image density sensor 40 in the at least one embodiment is provided downstream of the photosensitive drum 22K in the rotation direction of the intermediate transfer member 27 in order to detect the image density of the toner image formed on the intermediate transfer member 27. The image density sensor 40 may be provided at a position for detecting the image density of the toner image formed on the photosensitive drum 22 or the transfer material 11. The detection result obtained through detection by the sensor system 311 is transmitted to the engine controller 301.

The engine controller 301 is an information processing device including a central processing unit (CPU) 303, a random access memory (RAM) 305, and a nonvolatile memory 306. The engine controller 301 also includes an application specific integrated circuit (ASIC) 304, which is a dedicated device that controls an operation of the engine mechanism 302, and an engine I/F 307. The CPU 303 and the ASIC 304 write and read various kinds of information (total number of sheets subjected to image formation and operating time) to and from the nonvolatile memory device provided to each of the four image forming units 20. The engine I/F 307 is a communication interface that controls communication between the engine controller 301 and the video controller 103.

The CPU 303, the ASIC 304, the RAM 305, the memory 306, and the engine I/F 307 are communicably connected to each other through a system bus 312. Each component of the engine mechanism 302 is also connected to the system bus 312, and communication between the engine controller 301 and the engine mechanism 302 is performed through the system bus 312. The system bus 312 includes, for example, an address bus and a data bus.

The CPU 303 uses the RAM 305 as a main memory or a work area, and executes various control programs stored in the memory 306 to control the operation of the engine mechanism 302. The CPU 303 acquires the detection result obtained through detection by the sensor system 311, and controls a printing sequence.

In a case where the CPU 303 acquires a print execution instruction from the video controller 103 through the engine I/F 307, the CPU 303 first drives the image forming system 309 to cause the charging device 23 to charge the surface of the photosensitive drum 22. The CPU 303 drives the laser scanner system 308 by a laser drive signal generated based on the image data to cause the exposure device 24 to form an electrostatic latent image on the photosensitive drum 22.

Subsequently, the CPU 303 drives the image forming system 309 to cause the developing device 26 to develop the electrostatic latent image and thereby form monochromatic toner images on the respective photosensitive drums 22Y, 22M, 22C, and 22K. The CPU 303 causes the image forming system 309 to sequentially superimpose and transfer those monochromatic toner images onto the intermediate transfer member 27 and thereby form a multicolor toner image on the intermediate transfer member 27. Simultaneously with the drive of the image forming system 309, the CPU 303 controls the sheet feeding-and-conveying system 310 to feed the transfer material 11 from the sheet feeder by the sheet feeding roller. The CPU 303 causes the image forming system 309 to transfer the multicolor toner image onto the transfer material 11, and then controls the fixing device 30 to fix the multicolor toner image on the transfer material 11.

The ASIC 304 performs control of each motor and control of the high-voltage power supply for a developing bias or the like, which are required for executing various print sequences, in accordance with instructions from the CPU 303. The ASIC 304 operates in cooperation with the CPU 303 to control the operation of the engine mechanism 302.

<Video Controller>

Figure 4:
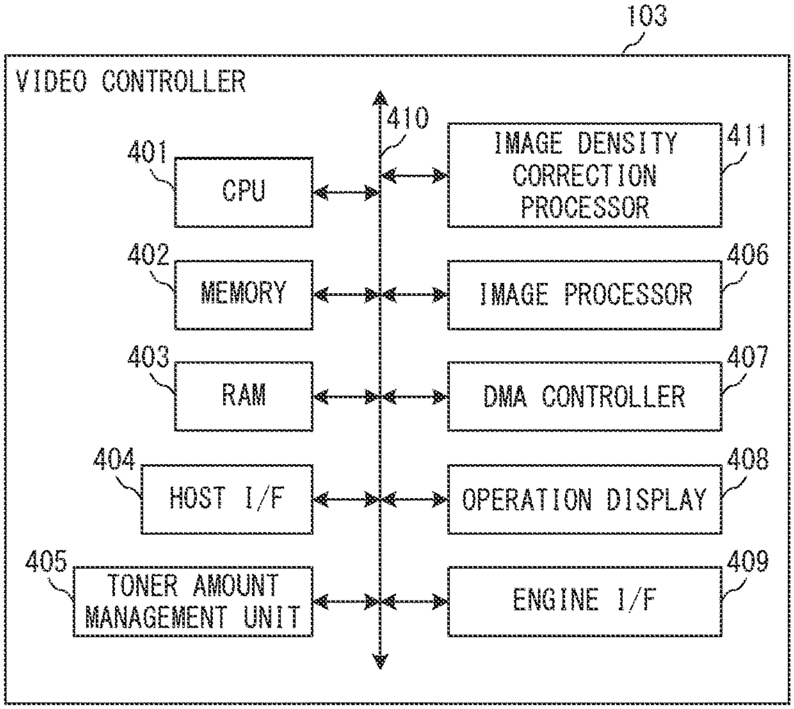
FIG. 4 is an explanatory diagram of a video controller.

FIG. 4 is an explanatory diagram of the video controller 103. The video controller 103 is an information processing device including a CPU 401, a memory 402, and a RAM 403. The video controller 103 includes a host I/F 404, a toner amount management unit 405, an image density correction processor 411, an image processor 406, a DMA controller 407, an operation display 408, and an engine I/F 409. The components of the video controller 103 are communicably connected to each other through a system bus 410. The system bus 410 includes, for example, an address bus and a data bus.

The CPU 401 controls an operation of the video controller 103 by executing computer programs stored in the memory 402. The memory 402 is nonvolatile, and stores various control codes (computer programs) to be executed by the CPU 401 and data to be used for control. The memory 402 is formed of, for example, a read only memory (ROM), an electrically erasable programmable read-only memory (EEPROM), a hard disk drive, or the like. The RAM 403 functions as a main memory, a work area, or the like for the CPU 401.

The host I/F 404 is a communication interface, and acquires a print execution instruction, print data, control data, and the like from the host computer 101. The print data received by the host I/F 404 is stored in the RAM 403. The print data is bitmap data or page description language (PDL) data that has been subjected to halftone processing by the host computer 101 or the like. The PDL data is data described in a page description language in order to create image data. The print data usually includes instructions to draw characters, graphics, images, and the like.

The DMA controller 407 transfers data stored in the RAM 403 to the engine I/F 409 and the image processor 406 in accordance with the instructions received from the CPU 401. The image processor 406 performs various kinds of data processing (for example, estimation of a toner consumption amount) through use of the image data acquired from the RAM 403 in accordance with the instructions received from the CPU 401. A detailed operation of the image processor 406 is described later.

The operation display 408 is a user interface provided to a main body of the image forming apparatus 102. The operation display 408 receives input of various settings and instructions from a user through an input interface, and displays various kinds of information on the image forming apparatus 102 through an output interface. The engine I/F 409 is a communication interface with respect to the printer engine 104. The engine I/F 409 transmits, for example, a laser drive signal output from the image processor 406 to the printer engine 104.

The toner amount management unit 405 updates, based on the toner consumption amount for each page notified by the image processor 406, toner remaining amounts in the developing devices 26Y, 26M, 26C, and 26K of the image forming units 20Y, 20M, 20C, and 20K, respectively. The updated toner remaining amounts are displayed on the operation display 408. The user is thereby notified of the toner remaining amounts. The toner amount management unit 405 may notify the host computer 101 of the toner remaining amounts through the host I/F 404.

The image density correction processor 411 performs the image density correction processing in accordance with an instruction received from the CPU 401 or an instruction received from the printer engine 104 through the engine I/F 409. The image density correction processor 411 generates a tone correction table (a tone correction condition) to be used at a time of performing image density correction by image density correction processing. A detailed operation of the image density correction processor 411 is described later.

Functions of the image processor 406 may be implemented as an ASIC or dedicated hardware, and some or all of the functions may be implemented by the CPU 401. In addition, some or all of the functions of the video controller 103 may be implemented by an external device such as the host computer 101.

<Image Processor>

Figure 5:
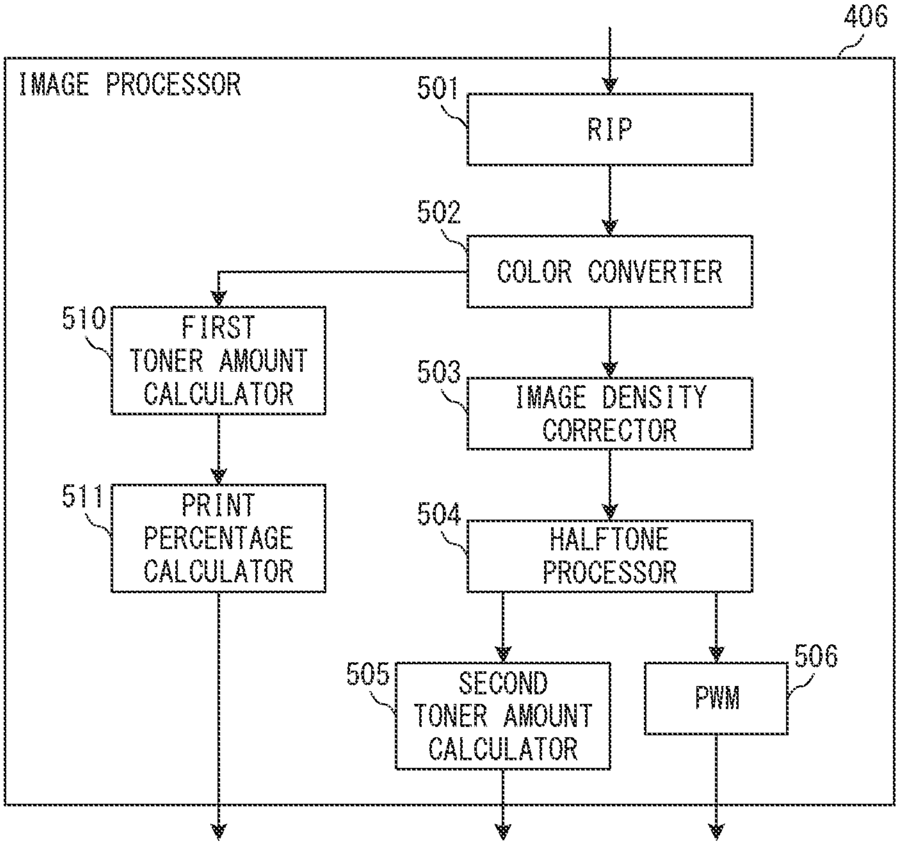
FIG. 5 is an explanatory diagram of an image processor.

FIG. 5 is an explanatory diagram of the image processor 406. The image processor 406 includes a raster image processer (RIP) 501, a color converter 502, an image density corrector 503, a halftone processor 504, and a pulse width modulator (PWM) 506. Those components are used for performing predetermined image processing on image data and generating a laser drive signal that is a pulse width modulation (PWM) signal for controlling light emission of the exposure device 24. In addition, the image processor 406 includes a first toner amount calculator 510, a second toner amount calculator 505, and a print percentage calculator 511 that are used for calculating an amount of toner to be consumed from the image data.

The RIP 501 analyzes the image data described in PDL acquired from the RAM 403 to generate intermediate language data, and further rasterizes the intermediate language data to generate raster image data. The raster image data is stored in a predetermined area within the RAM 403 as image data on the respective colors of R (red), G (green), and B (blue).

The color converter 502 performs color matching processing for converting the image data on the respective colors stored in the RAM 403 into device RGB signals that match a color reproduction range of the image forming apparatus 102. The color converter 502 further performs color separation processing for converting the device RGB signals into YMCK signals that represent the toner colors of the image forming apparatus 102. In this manner, the color converter 502 sequentially converts the image data on the respective colors of RGB generated by the RIP 501 into YMCK image data and stores the YMCK image data in a predetermined area within the RAM 403.

The image density corrector 503 performs halftone processing for converting each tone value of the YMCK image data stored in the RAM 403 through use of a tone correction table. The image density corrector 503 converts the YMCK image data based on the tone correction condition. This is processing for setting, to a predetermined relationship, a relationship between each tone value of the YMCK image data and a density of an image to be output onto the transfer material 11 by the printer engine 104.

The halftone processor 504 performs halftone processing (ordered dither or the like) on each piece of multivalued (in this case, 8-bit) YMCK image data corrected by the image density corrector 503. Through the halftone processing, each piece of YMCK image data is quantized into 1-bit image data reproducible by the printer engine 104. The 1-bit image data is stored in an image memory within the RAM 403. The PWM 506 converts the 1-bit image data subjected to the halftone processing and stored in the image memory into a laser drive signal (laser exposure time) by PWM processing.

The first toner amount calculator 510 calculates a toner amount (first toner consumption amount) to be consumed per page based on the image data on each color of YMCK generated by the color converter 502 and stored in the RAM 403. The print percentage calculator 511 calculates the print percentage for each page based on the toner consumption amount per page calculated by the first toner amount calculator 510. The second toner amount calculator 505 calculates the toner amount (second toner consumption amount) to be consumed per page based on the 1-bit image data on each color of YMCK generated by the halftone processor 504.

The first and second toner consumption amounts calculated by the first toner amount calculator 510 and the second toner amount calculator 505 and the print percentage calculated by the print percentage calculator 511 are transmitted to the toner amount management unit 405. A detailed operation of each of the first toner amount calculator 510, the print percentage calculator 511, the second toner amount calculator 505, and the toner amount management unit 405 is described later.

<Image Density Correction Processor>

Figure 6:
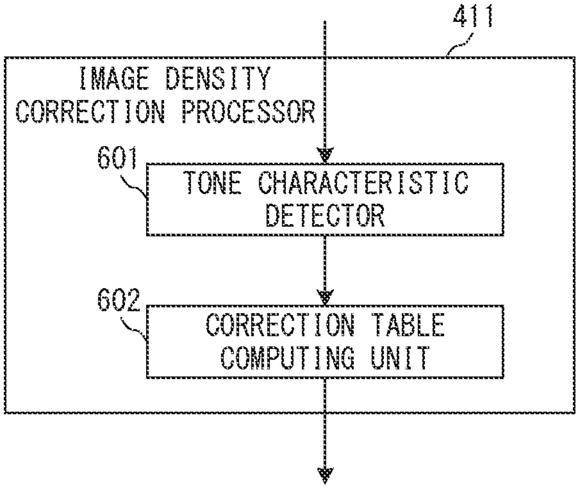
FIG. 6 is an explanatory diagram of an image density correction processor.

FIG. 6 is an explanatory diagram of the image density correction processor 411. The image density correction processor 411 includes a tone characteristic detector 601 and a correction table computing unit 602. The image density correction processor 411 creates a tone correction table (a tone correction condition) to be used for the processing of the image density corrector 503, and stores the tone correction table (the tone correction condition) in the RAM 403.

The tone characteristic detector 601 detects a tone characteristic of the image forming apparatus 102. To that end, the image forming apparatus 102 forms, on the intermediate transfer member 27, an image for detection for tone correction, which is provided in advance for detecting a gamma characteristic for each toner color. An image density of this image for detection is read by the image density sensor 40. The tone characteristic detector 601 generates a tone characteristic (gamma characteristic of the printer engine 104) in which the image density of the image for detection read by the image density sensor 40 and a tone level of the image for detection of each color are associated with each other. The tone characteristic detector 601 transmits the generated tone characteristic to the correction table computing unit 602.

The correction table computing unit 602 generates a tone correction table (a tone correction condition) for obtaining an ideal tone characteristic by correcting an actually measured tone characteristic of the printer engine 104 based on the tone characteristic acquired from the tone characteristic detector 601. The correction table computing unit 602 updates content of the already generated tone correction table to the newly generated tone correction table.

The image density corrector 503 converts each tone value of the YMCK image data through use of the tone correction table (the tone correction condition) generated in such a manner. Thus, the relationship between each tone value of the image data of each color of YMCK and the density of the image formed on the transfer material 11 is maintained to the predetermined relationship irrespective of variations in the gamma characteristic of the image forming apparatus 102 (printer engine 104) and changes over time thereof <Operation of Video Controller>

The video controller 103 having such a configuration receives a print execution instruction from the host computer 101, and transmits data and the like required for the image formation to the printer engine 104. A flow of such processing is described.

The video controller 103 acquires a print execution instruction from the host computer 101 through the host I/F 404. In a case where the CPU 401 of the video controller 103 acquires the print execution instruction, the CPU 401 acquires print data through the host I/F 404, and stores the print data in the RAM 403.

The CPU 401 controls the RIP 501 of the image processor 406 to rasterize the image data stored in the RAM 403. The CPU 401 controls the color converter 502 to perform the color conversion processing on the rasterized image data. The CPU 401 controls the image density corrector 503 to perform the image density correction processing on the image data subjected to the color conversion. The CPU 401 controls the halftone processor 504 to perform the halftone processing on the image data subjected to the image density correction processing. The CPU 401 controls the PWM 506 to perform the PWM processing on the image data subjected to the halftone processing.

The CPU 401 transmits a laser drive signal generated by the PWM processing to the printer engine 104 through the engine I/F 409. At the same time, the CPU 401 controls the first toner amount calculator 510 and the second toner amount calculator 505 to calculate the toner consumption amount. The CPU 401 controls the print percentage calculator 511 to calculate the print percentage. The CPU 401 causes the first toner amount calculator 510, the second toner amount calculator 505, and the print percentage calculator 511 to notify the toner amount management unit 405 of respective calculation results thereof <First Toner Amount Calculator and Print Percentage Calculator>

Figure 7:
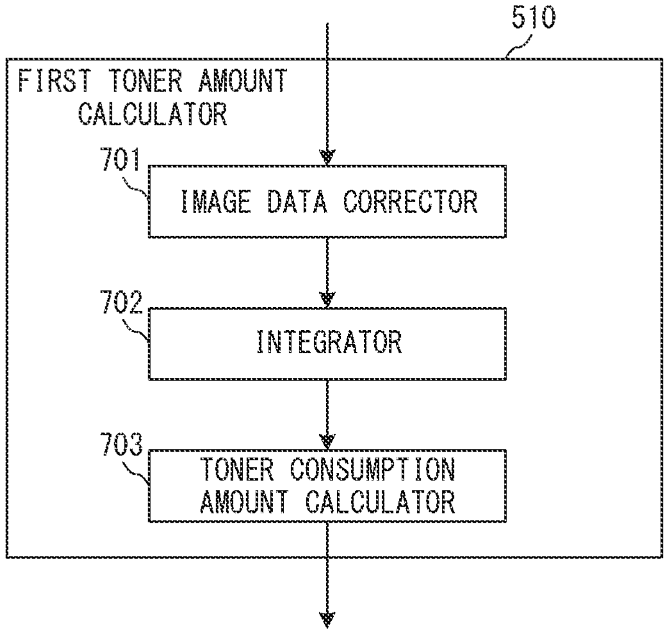
FIG. 7 is an explanatory diagram of a first toner amount calculator.

Processing of the first toner amount calculator 510 and processing of the print percentage calculator 511 are described in detail. FIG. 7 is an explanatory diagram of the first toner amount calculator 510. The first toner consumption amount for black (K) is described below, but the first toner consumption amounts for the other chromatic colors (yellow, magenta, and cyan) are also calculated by the same processing. The first toner amount calculator 510 calculates the first toner consumption amount based on the multivalued (8-bit) pixel value obtained from the image data on each color of YMCK subjected to the color conversion processing and stored in the RAM 403. The image data on each color of YMCK subjected to the color conversion processing and stored in the RAM 403 is data that has not been subjected to the halftone processing by the image density corrector 503. The first toner amount calculator 510 includes an image data corrector 701, an integrator 702, and a toner consumption amount calculator 703.

Figure 8:
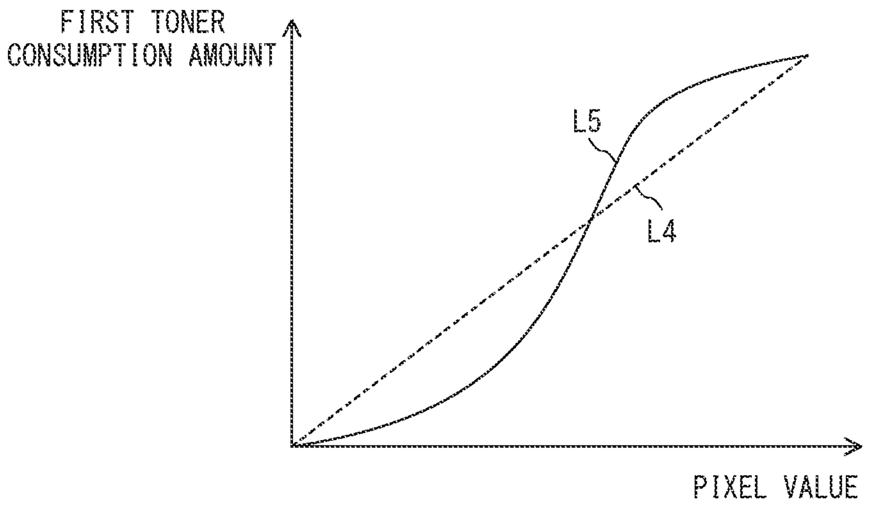
FIG. 8 is an explanatory graph of a first toner consumption amount.

FIG. 8 is an explanatory graph of the first toner consumption amount. The first toner consumption amount has a correlation with the pixel value based on the image data subjected to the color conversion processing by the color converter 502. However, the relationship between the first toner consumption amount and the pixel value based on the image data subjected to the color conversion processing by the color converter 502 is not such a proportional relationship as indicated by a graph L4 but a non-linear relationship as indicated by a graph L5. In the at least one embodiment, the toner consumption amount required for a predetermined pixel value is used as a reference to obtain in advance a correction value weighted by a predetermined coefficient for eliminating a difference between the first toner consumption amount required for each pixel value and the toner consumption amount used as the reference.

FIG. 9 shows an example of a weighting coefficient table indicating a correspondence relationship between the pixel value (input pixel value) based on the image data to be input to the first toner amount calculator 510 and a weighted correction value (corrected pixel value) corresponding to each pixel value. The corrected pixel value corresponding to the input pixel value is obtained from the weighting coefficient table.

The image data corrector 701 acquires the image data (pixel value) subjected to the color conversion processing from the RAM 403, and derives the corrected pixel value through use of the weighting coefficient table of FIG. 9. For example, in a case where the pixel value of the image data subjected to the color conversion processing and acquired from the RAM 403 is "31", the image data corrector 701 refers to the weighting coefficient table to derive the corrected pixel value of "23". The image data corrector 701 transmits the derived corrected pixel value to the integrator 702.

The integrator 702 integrates the corrected pixel values sequentially acquired from the image data corrector 701. The toner consumption amount calculator 703 calculates the first toner consumption amount through use of an integrated value of the corrected pixel values obtained by the integrator 702 and a predetermined calculation formula. The toner consumption amount calculator 703 transmits the calculated first toner consumption amount to the toner amount management unit 405.

The print percentage calculator 511 uses the toner consumption amount obtained in a case where an image within a page is entirely solid as a reference to calculate the print percentage through use of the first toner consumption amount per page calculated by the toner consumption amount calculator 703. The print percentage calculator 511 transmits the calculated print percentage to the toner amount management unit 405. The print percentage is, for example, a value obtained by dividing, by the toner consumption amount used as the reference, the first toner consumption amount per page calculated by the toner consumption amount calculator 703. For example, in a case w % here the toner consumption amount used as the reference is 300 mg in a case where a solid image is formed on the entire surface of the transfer material 11 of the A4 size and the first toner consumption amount calculated by the toner consumption amount calculator 703 is 30 mg, the print percentage is 10%.

<Second Toner Amount Calculator>

Figures 10, 11:
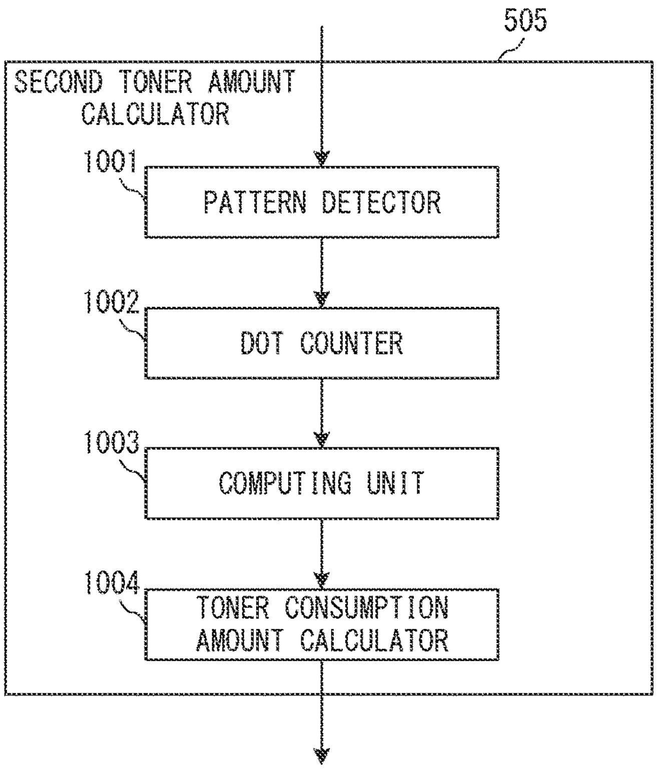
FIG. 10 is an explanatory diagram of a second toner amount calculator.
FIG. 11 is an exemplary table of a relationship between the number of consecutive printing dots and a correction coefficient.

FIG. 10 is an explanatory diagram of the second toner amount calculator 505. The second toner consumption amount for black (K) is described below, but the second toner consumption amounts for the other chromatic colors (yellow, magenta, and cyan) are also calculated by the same processing. The second toner amount calculator 505 calculates the second toner consumption amount based on line widths of printing pixels and the number of printing pixels included in the image data on each color of YMCK subjected to the halftone processing and stored in the RAM 403. This image data is data quantized to one bit by the halftone processing. The second toner amount calculator 505 includes a pattern detector 1001, a dot counter 1002, a computing unit 1003, and a toner consumption amount calculator 1004.

The pattern detector 1001 analyzes binary data of 1-bit image data subjected to the halftone processing, and detects a region corresponding to predetermined pixel patterns different in line width (number of consecutive printing dots). Specifically, the pattern detector 1001 detects a plurality of pixel patterns in which the number of consecutive printing dots is changed in a range of from 1 to 8 from a dot array of a target image.

The dot counter 1002 counts the number of pixels corresponding to each of image patterns having predetermined numbers (in this case, 1 to 8) of consecutive printing dots. The number of pixels corresponding to the pixel pattern having a line width of 1 pixel is counted as "Count1". The number of pixels corresponding to the pixel pattern having a line width of 2 pixels is counted as "Count2". In the same manner, the numbers of pixels corresponding to the pixel patterns having line widths of 3 to 8 pixels are counted as "Count3" to "Count8", respectively. The number of pixels corresponding to a pixel pattern having a line width of 9 pixels or more is counted as "Count*_*".

In the at least one embodiment, the pattern detector 1001 detects the corresponding region based on a predetermined line width in a scanning direction of the laser light emitted by the exposure device 24. The dot counter 1002 counts the number of pixels included in that region.

The computing unit 1003 calculates an integrated value by multiplying the number of printing pixels counted for each number of consecutive printing dots by a correction coefficient corresponding to that division. The correction coefficient is a numerical value that can be determined in advance based on actual measurement. For example, it is preferred to assume that the amount of toner consumed by one pixel of a solid image having no edge portions is "1", measure the toner consumption amount per pixel for each pixel pattern varied in line width, and determine a rate of change as the correction coefficient. FIG. 11 is an exemplary table of a relationship between the number of consecutive printing dots and the correction coefficient.

The toner consumption amount calculator 1004 calculates the second toner consumption amount based on the integrated value calculated by the computing unit 1003 and the toner consumption amount per unit pixel. The toner consumption amount calculator 1004 transmits the calculated second toner consumption amount to the toner amount management unit 405.

<Toner Amount Management Unit>

The toner amount management unit 405 determines which of the first and second toner consumption amounts acquired from the first toner amount calculator 510 and the second toner amount calculator 505, respectively, is to be used to calculate each toner remaining amount based on the print percentage acquired from the print percentage calculator 511. The toner amount management unit 405 updates, based on the toner consumption amount for each page, the toner remaining amounts in the developing devices 26Y, 26M, 26C, and 26K of the image forming units 20Y, 20M, 20C, and 20K, respectively. Results of updating the toner remaining amounts are displayed on the operation display 408 by the CPU 401.

In general, a printed matter on which an image mainly formed of characters is printed has a low print percentage, and a printed matter on which a mainly graphic image including a large number of tone portions is printed has a medium to high print percentage. Therefore, in a case where the print percentage is low, the toner remaining amount is calculated based on the second toner consumption amount calculated by the second toner amount calculator 505 capable of accurately calculating the toner consumption amount for a character portion. In a case where the print percentage is medium to high, the toner remaining amount is calculated based on the first toner consumption amount calculated by the first toner amount calculator 510 capable of accurately calculating the toner consumption amount for a tone portion.

Figure 12:
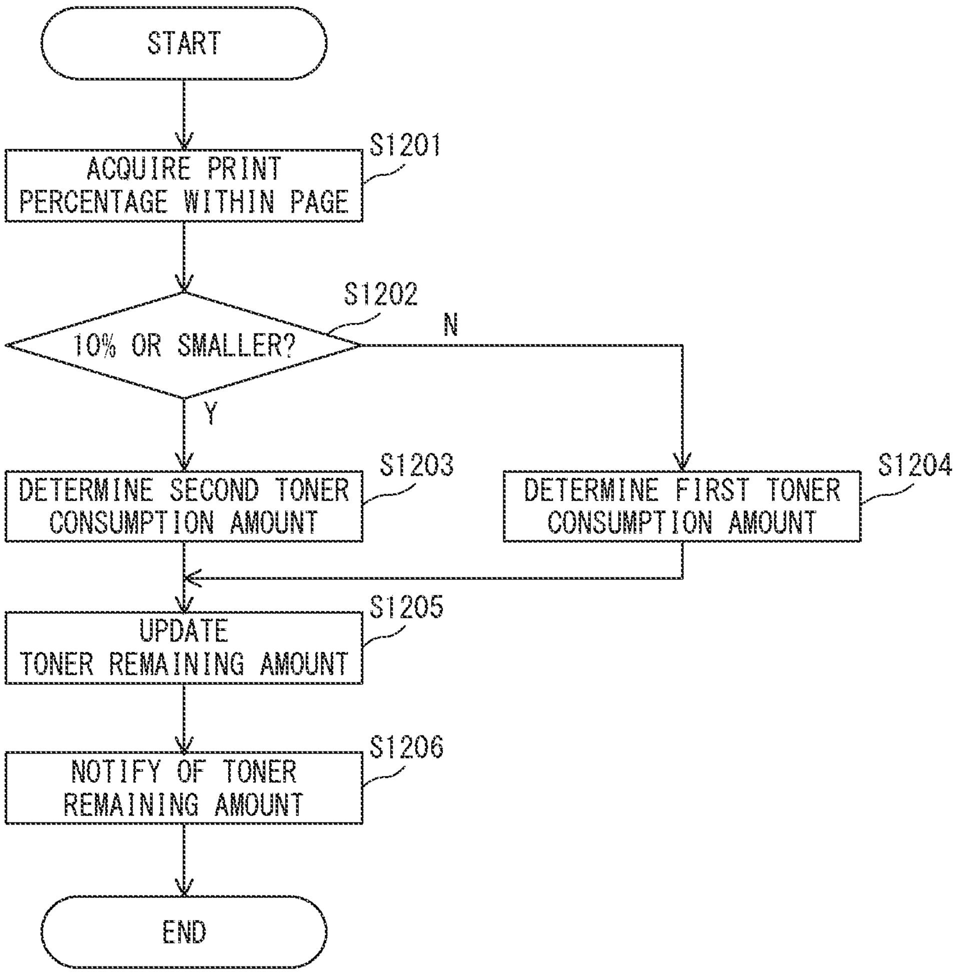
FIG. 12 is a flow chart for illustrating toner remaining amount calculation processing.

FIG. 12 is a flow chart for illustrating toner remaining amount calculation processing performed by the toner amount management unit 405. The toner amount management unit 405 calculates the toner remaining amounts in the developing devices 26Y, 26M, 26C, and 26K of the image forming units 20Y, 20M, 20C, and 20K, respectively, each time the printer engine 104 outputs one image. The toner amount management unit 405 performs this processing under the control of the CPU 401.

The toner amount management unit 405 acquires the print percentage within each page from the print percentage calculator 511 (Step S1201). The toner amount management unit 405 determines whether or not the acquired print percentage is equal to or smaller than a predetermined value, in this case, 10% or smaller (Step S1202). In a case where the print percentage is 10% or smaller (Y in Step S1202), the toner amount management unit 405 determines the toner consumption amount to be the second toner consumption amount acquired from the second toner amount calculator 505 (Step S1203). In a case where the print percentage is larger than 10% (N in Step S1202), the toner amount management unit 405 determines the toner consumption amount to be the first toner consumption amount acquired from the first toner amount calculator 510 (Step S1204).

The toner amount management unit 405 updates the toner remaining amount by subtracting the toner consumption amount determined in the processing step of Step S1203 or Step S1204 from the previous toner remaining amount (Step S1205). The toner amount management unit 405 notifies the operation display 408 of the updated toner remaining amount, and ends the processing (Step S1206). The updated toner remaining amount is displayed on the operation display 408.

In the at least one embodiment, as a criterion for determining which of the first and second toner consumption amounts calculated by the first toner amount calculator 510 and the second toner amount calculator 505 is to be used, a threshold value of the print percentage is set to 10%. The threshold value of the print percentage may be set for each color of YMCK. For example, chromatic colors (Y, M, and C) are less frequently used in a character image, and are often used in a graphic image including a large number of tone portions. For that reason, the threshold value of the print percentage for black (K) may be set to 10%, and the threshold value of the print percentage for chromatic colors may be set to 5% with priority given to the calculation accuracy of the toner consumption amount for the tone portion.

Figure 13A:
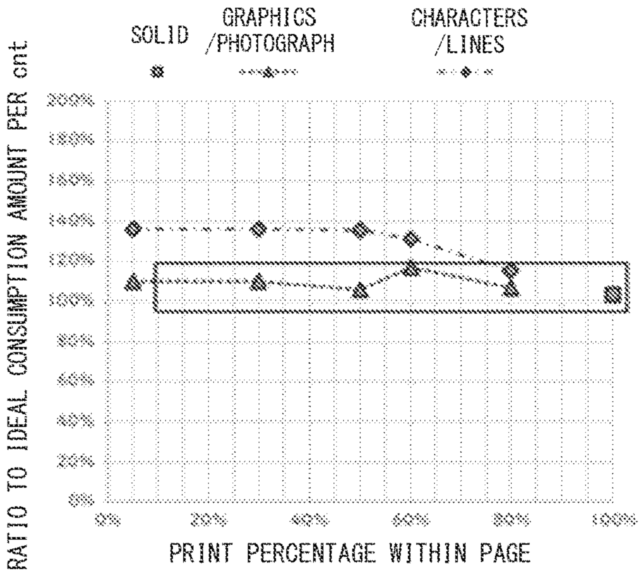
FIG. 13A, FIG. 13B, and FIG. 13C are explanatory graphs of calculation accuracy of a toner consumption amount.
Figure 13B:
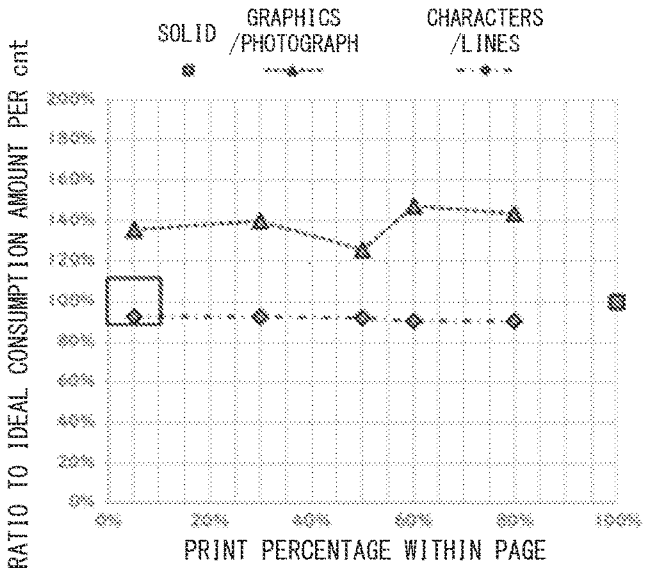
Figure 13C:
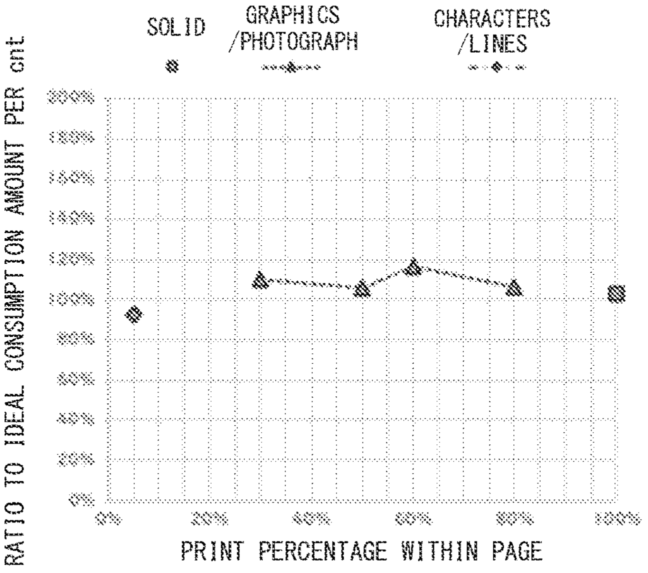

FIG. 13A to FIG. 13C are explanatory graphs of the calculation accuracy of the toner consumption amount exhibited by the image forming apparatus 102 having the configuration described above. The horizontal axis indicates a print percentage % within a page, and the vertical axis indicates a ratio of an actual toner consumption amount mg/cnt per count with reference to an ideal toner consumption amount mg/cnt per count.

Each plot corresponds to an image type and the print percentage within a page. Specifically, a square plot, a triangle plot, and a rhombus plot indicate the ratios of the toner consumption amounts for the respective print percentages for a (solid) image having a density of 100% on the entire page, a graphic image, and an image formed of characters and lines, respectively. The graphic image is assumed to be used mainly for printing a point-of-purchase (POP) image such as a poster. The characters and lines are assumed to be used for printing text, drawings, and the like. The ratio of the toner consumption amount closer to 100% indicates that the toner consumption amount can be calculated more accurately irrespective of a purpose of the user.

FIG. 13A shows a case of the first toner consumption amount calculated by the first toner amount calculator 510. The solid image (square) and the graphic images (triangles) have values close to 100%, which are close to the ideal toner consumption amount per count. However, the images (rhombus) of characters and lines have values of from 120% to 140%, which are found to fall out of the ideal toner consumption amount per count. That is, it is indicated that the first toner consumption amount calculated by the first toner amount calculator 510 is not highly accurate for an image formed of characters and lines.

FIG. 13B shows a case of the second toner consumption amount calculated by the second toner amount calculator 505. The images (rhombi) formed of characters and lines have values close to 100%, while the graphic images (triangles) and the solid image (square) have values of from 120% to 140%. That is, it is indicated that the second toner consumption amount calculated by the second toner amount calculator 505 is not highly accurate for a graphic image and a solid image.

FIG. 13C shows a case of the toner consumption amount calculated in the at least one embodiment. In a case where the print percentage is larger than 10%, the first toner consumption amount calculated by the first toner amount calculator 510 is used, and hence the solid image (square) and the graphic images (triangles) have values close to 100% (corresponding to the portion surrounded by the black frame in FIG. 13A). In a case where the print percentage is 10% or smaller, the second toner consumption amount calculated by the second toner amount calculator 505 is used, and hence the image (rhombus) formed of characters and lines has a value close to 100% (corresponding to the portion surrounded by the black frame in FIG. 13B).

In FIG. 13C, every value is close to 100%, thereby indicating that the toner consumption amount is accurately calculated. As described above, the first toner consumption amount calculated by the first toner amount calculator 510 is selected for the graphic images printed for use in posters and POP Images, most of which have a high print percentage within a page. The second toner consumption amount calculated by the second toner amount calculator 505 is selected for the images formed of characters and lines printed for use in text and drawings, most of which have a low print percentage within a page. Through selection of the toner consumption amount in such a manner, the accuracy of the calculated toner consumption amount and the toner remaining amount calculated from the toner consumption amount is improved.

As described above, the image forming apparatus 102 according to the at least one embodiment switches a counting method used for calculating the toner consumption amount depending on the print percentage within a page. Therefore, the image forming apparatus 102 can accurately calculate the toner consumption amount irrespective of the printing purpose of the user. The second toner amount calculator 505 in the at least one embodiment is arranged in the video controller 103, but the second toner amount calculator 505 may be arranged in the printer engine 104.

Another Example of Calculation of Toner Consumption Amount

The toner amount management unit 405 may perform weighting corresponding to the print percentage on each of the first toner consumption amount calculated by the first toner amount calculator 510 and the second toner consumption amount calculated by the second toner amount calculator 505, and may use a total value thereof as the toner consumption amount. In this case, instead of the toner consumption amount being switched at a predetermined print percentage, usage ratios of the first toner amount calculator 510 and the second toner amount calculator 505 gradually change in accordance with the print percentage, and hence it is possible to suppress a sudden change in calculation accuracy of the toner consumption amount in the vicinity of a predetermined print percentage.

The toner amount management unit 405 multiplies each of the first toner consumption amount (TonerCnt1) calculated by the first toner amount calculator 510 and the second toner consumption amount (TonerCnt2) calculated by the second toner amount calculator 505 by the usage ratio corresponding to the print percentage. The toner amount management unit 405 uses a sum value of results of the multiplication as the toner consumption amount. Assuming that the usage ratio of TonerCnt1 is R % and the usage ratio of TonerCnt2 is (100−R) %, the toner consumption amount (Toner_value) is calculated by the following equation.

$$\text{Toner\_value}=\text{TonerCnt1}\times R/100+\text{TonerCnt2}\times(100-R)/100$$

Figure 14:
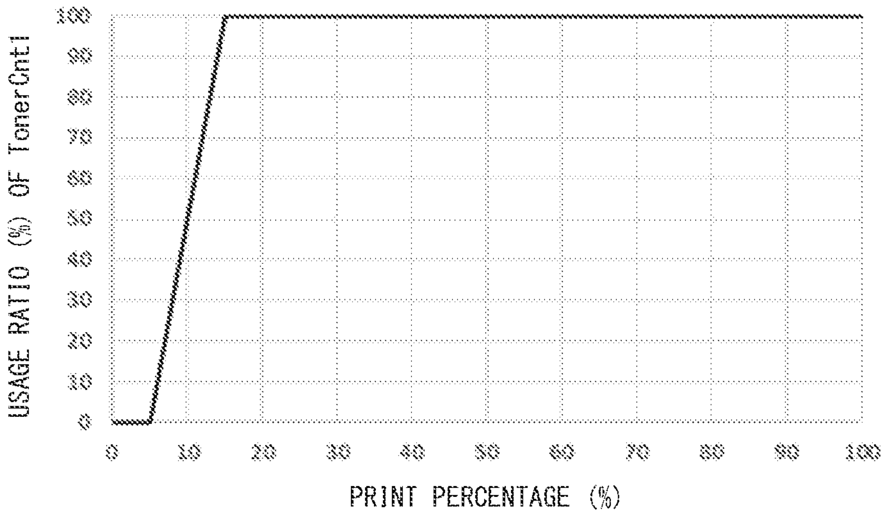
FIG. 14 is an explanatory graph of a relationship between a usage ratio of TonerCnt1 and a print percentage.

The usage ratio R % of TonerCnt1 changes in accordance with the print percentage. FIG. 14 is an explanatory graph of a relationship between the usage ratio of TonerCnt1 and the print percentage.

The usage ratio of TonerCnt1 is set to 0% in a case where the print percentage is smaller than a first predetermined value, in this case, 5% or smaller. In a case where the print percentage is low and an image is assumed to be mainly formed of characters, the toner consumption amount is calculated through use of only TonerCnt2, which is high in calculation accuracy of the toner consumption amount for the character portion.

In a case where the print percentage is equal to or larger than a second predetermined value larger than the first predetermined value, in this case, in a case where the print percentage is 15% or larger, the usage ratio of TonerCnt1 is set to 100%. In a case where an image is assumed to be mainly graphic with a relatively high print percentage, the toner consumption amount is calculated through use of only TonerCnt1, which is high in calculation accuracy of the toner consumption amount for the tone portion.

In a case where the print percentage is larger than the first predetermined value and equal to or smaller than the second predetermined value (between 5% and 15%), the usage ratio of TonerCnt1 is set to change continuously as the print percentage increases. Thus, it is possible to suppress a sudden change in calculation accuracy of the toner consumption amount in the vicinity of a predetermined print percentage.

Figure 15:
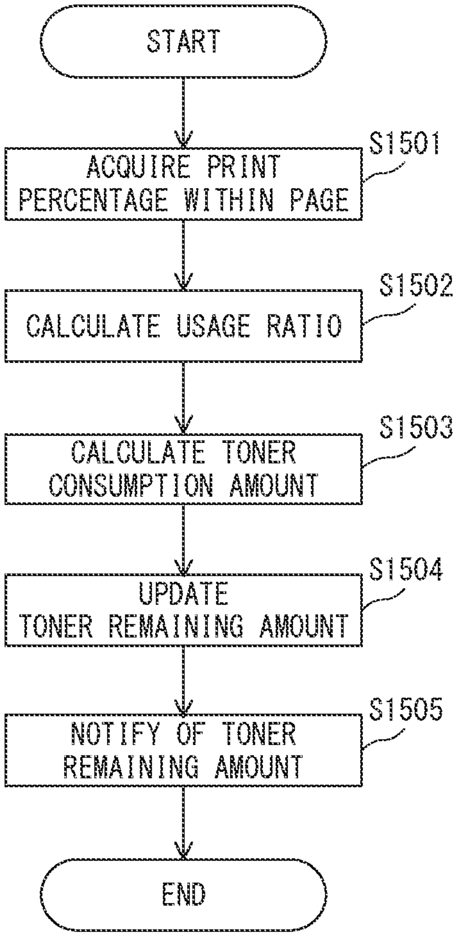
FIG. 15 is a flow chart for illustrating the toner remaining amount calculation processing.

FIG. 15 is a flow chart for illustrating the toner remaining amount calculation processing performed by the toner amount management unit 405. The toner amount management unit 405 calculates the toner remaining amounts in the developing devices 26Y, 26M, 26C, and 26K of the image forming units 20Y, 20M, 20C, and 20K, respectively, each time the printer engine 104 outputs one image. The toner amount management unit 405 performs this processing under the control of the CPU 401.

The toner amount management unit 405 acquires the print percentage within each page from the print percentage calculator 511 (Step S1501). The toner amount management unit 405 calculates the usage ratios of TonerCnt1 and TonerCnt2 from the acquired print percentage based on a previously obtained correspondence table between the print percentage and the usage ratio of TonerCnt1 (Step S1502). The toner amount management unit 405 calculates the toner consumption amount based on the values of TonerCnt1 and TonerCnt2 and the usage ratios thereof (Step S1503).

The toner amount management unit 405 updates the toner remaining amount by subtracting the toner consumption amount calculated in the processing step of Step S1503 from the previous toner remaining amount (Step S1504). The toner amount management unit 405 notifies the operation display 408 of the updated toner remaining amount, and ends the processing (Step S1505). The updated toner remaining amount is displayed on the operation display 408.

Figure 16:
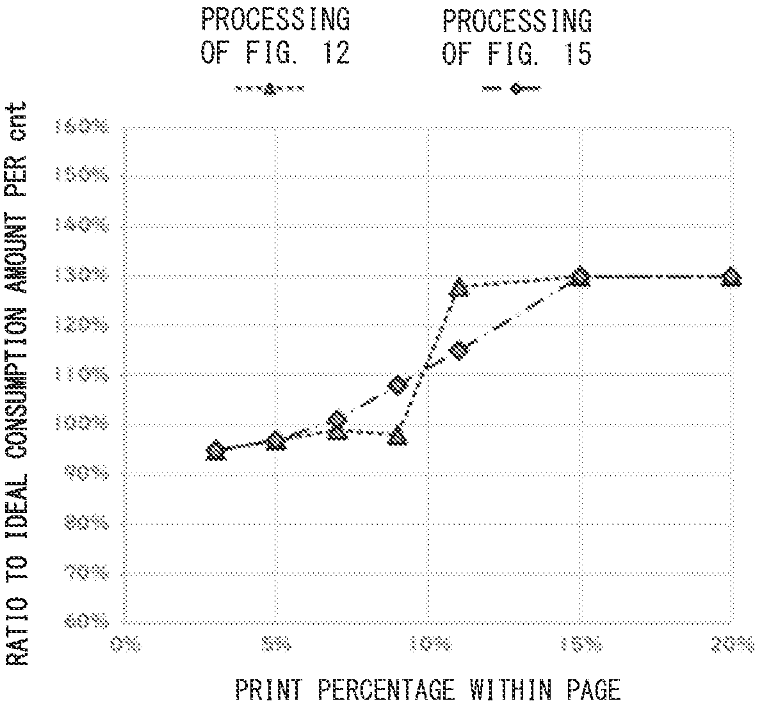
FIG. 16 is an explanatory graph of a change in calculation accuracy between toner consumption amounts.

FIG. 16 is an explanatory graph of a change in calculation accuracy between the toner consumption amounts calculated in the processing of FIG. 12 and the processing of FIG. 15. In this case, an image formed of characters and lines is used to compare the calculation accuracy of the toner consumption amounts obtained in a case where the image is printed at different print percentages. A triangle plot indicates the ratio of the toner consumption amount for each print percentage calculated in the processing of FIG. 12. A rhombus plot indicates the ratio of the toner consumption amount for each print percentage calculated in the processing of FIG. 15. The horizontal axis indicates the print percentage % within a page, and the vertical axis indicates the ratio of the actual toner consumption amount mg/cnt per count with reference to the ideal toner consumption amount mg/cnt per count.

In general, an image mainly formed of characters and lines has a low print percentage. In the processing of FIG. 12, the second toner consumption amount calculated by the second toner amount calculator 505 is used in a case where the print percentage is 10% or smaller, and the first toner consumption amount calculated by the first toner amount calculator 510 is used in a case where the print percentage is larger than 10%. Therefore, as indicated by the triangle plots of FIG. 16, the image formed only of characters and lines exhibits a sudden change in calculation accuracy of the toner consumption amount even when the print percentage slightly exceeds 10%.

In the processing of FIG. 15, the usage ratios of the first toner consumption amount calculated by the first toner amount calculator 510 and the second toner consumption amount calculated by the second toner amount calculator 505 are gradually changed in accordance with the print percentage. Therefore, as indicated by the rhombus plots of FIG. 16, it is possible to suppress a risk that the calculation accuracy of the toner consumption amount suddenly changes at a predetermined print percentage.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-163776, filed Oct. 12, 2022, which is hereby incorporated by reference herein in its entirety.

What is claimed is:

1. An image forming apparatus comprising:

a halftone processor configured to convert image data by performing halftone processing;

an image forming unit configured to form an image with toner based on the image data converted by the halftone processor;

a first determining unit configured to determine a first toner consumption amount for each page based on the image data before conversion by the halftone processor;

a second determining unit configured to determine a second toner consumption amount for each page based on the image data after conversion by the halftone processor;

a print percentage calculator configured to calculate a print percentage for one page based on the first toner consumption amount; and a notifying unit configured to notify of a remaining amount of the toner of the image forming unit based on the first toner consumption amount of a page of which the print percentage is greater than a threshold and the second toner consumption amount of a page of which the print percentage is equal to or less than the threshold.

2. The image forming apparatus according to claim 1, wherein the image forming unit includes:

a photosensitive member; and a developing device configured to contain the toner and develop an electrostatic latent image formed on the photosensitive member with the toner, and wherein the notifying unit is configured to update the remaining amount of the toner contained in the developing device by subtracting both the first toner consumption amount of the page of which the print percentage is greater than the threshold and the second toner consumption amount of the page of which the print percentage is equal to or less than the threshold from the remaining amount of the developer contained in the developing device.

3. The image forming apparatus according to claim 1, wherein the print percentage calculator is configured to calculate the print percentage by dividing a toner consumption amount in a case where an image within a page is entirely solid by the first toner consumption amount determined by the first determining unit.

4. The image forming apparatus according to claim 1, wherein the second determining unit is configured to determine the second toner consumption amount based on the image data quantized to one bit by the halftone processing.

5. An information processing device which is communicably connected to a printer configured to form an image with toner based on image data, the information processing device comprising:

a halftone processor configured to convert image data by performing halftone processing and transmit the image data to the printer, wherein the printer forms the image based on the converted image data transmitted from the halftone processor;

a first calculator configured to calculate a first toner consumption amount for each page based on the image data before performing the halftone processing by the halftone processor;

a second calculator configured to calculate a second toner consumption amount for each page based on the converted image data;

a print percentage calculator configured to calculate a print percentage for one page based on the first toner consumption amount; and an outputting unit configured to output a remaining amount of the toner of the image forming unit based on the first toner consumption amount of a page of which the print percentage is greater than a threshold and the second toner consumption amount of a page of which the print percentage is equal to or less than the threshold.

6. The information processing device according to claim 5, wherein the printer includes:

a photosensitive member; and a developing device configured to contain the toner and develop an electrostatic latent image formed on the photosensitive member with the toner, and wherein the outputting unit is configured to update the remaining amount of the toner contained in the developing device by subtracting both the first toner consumption amount of the page of which the print percentage is greater than the threshold and the second toner consumption amount of the page of which the print percentage is equal to or less than the threshold from the remaining amount of the developer contained in the developing device.

7. The information processing device according to claim 5, wherein the print percentage calculator is configured to calculate the print percentage by dividing a toner consumption amount in a case where an image within a page is entirely solid by the first toner consumption amount determined by the first calculator.

8. The information processing device according to claim 5, wherein the second calculator is configured to determine the second toner consumption amount based on the image data quantized to one bit by the halftone processing.

* * * * *